May 16, 1967  G. SAEGER  3,319,749
CONTROLLABLE FREE-RUNNING CLUTCH
Filed Dec. 27, 1965  2 Sheets-Sheet 2

(II-II)

Inventor:
Gert Saeger,
by Singer, Stern & Carlberg,
Attorneys.

United States Patent Office 3,319,749
Patented May 16, 1967

3,319,749
CONTROLLABLE FREE-RUNNING CLUTCH
Gert Saeger, Hamburg-Lemsahl, Germany, assignor to
Stielow G.m.b.H., Hamburg, Germany
Filed Dec. 27, 1965, Ser. No. 516,263
Claims priority, application Germany, Dec. 29, 1964,
St 23,149
7 Claims. (Cl. 192—27)

This invention relates to a controllable free-running coupling which includes a driving coupling member, a driven coupling member, and a rotatable body which is subjected to shear stress, is movable through a hole formed in a projecting rib of one of said coupling members, is of greater diameter than this rib is thick, and is movable into a driving recess in the other of said coupling members to take up the drive between the coupling members.

A free-running coupling operating as an over-running coupling is known in which rotatable bodies which form drive take-up members subjected essentially to shear stress are movably guided parallel to the axis of rotation of the system. Upon disengagement of the coupling as a result of relative movement produced between the coupling members the rotatable bodies must be displaced from engagement apertures against the force of a spring. This type of arrangement is disadvantageous with respect to the switching instant, particularly the moment of engagement of the rotatable bodies, since the rotatable bodies must be raised, for example in the engagement process, by lateral friction due to centrifugal force. In other respects, in the disengaged state of the coupling, there is always a spring pressure exerted on the rotatable bodies. Thus, a compression force is exerted on said other coupling member which is accompanied by friction effects. As a result of the continuous spring pressure voluntary control is not possible since the rotatable bodies are always forced into contrary recesses. The rotatable bodies are thereby arranged in a rim of the driving coupling member with the result that the oscillatory mass of the drive is increased and the sensitivity is impaired.

The use of balls as coupling bodies is also known in a stepped switch mechanism in which is arranged a channel system which permits a ball to fall from one side to another always in dependence on a rotary movement.

It is an object of the present invention to provide a free-running coupling which has its instant of change-over accurately controllable from externally of the coupling, which can be engaged and disengaged in arbitrary manner with greater accuracy, and in which the coupling bodies are at rest and without engagement in the disengaged state of the coupling, so avoiding any over-running.

Thus, the couplings according to the invention can be used for the control of precision machines.

In accordance with the invention, an axially projecting rib is provided on the driven coupling member; the driving coupling member is disposed within this rib and is provided with a recess in its peripheral surface in which a rotatable body can at least partially engage; a control ring is provided around the outside of the rib of the driven coupling member and is movably guided thereon; and at least one recess open to the rib is provided in the control ring; said control ring being movable between two abutments such that the control ring recess is offset relative to the recess in the driving coupling member when the control ring strikes against one of said abutments but is brought into alignment therewith when said control ring strikes against the other of said abutments; the rotatable body being movably guided in the radial direction of the coupling; and the centrifugal forces aiding disengagement of the coupling. Preferably, only one rotatable body is provided.

Moreover, spring means are preferably provided in order to retain the control ring against said one abutment, i.e. in a position which corresponds to the engaged position of the coupling.

According to a preferred embodiment of the invention, the abutments are formed by the opposite sides of a pin mounted on the driven coupling member and extending into an elongated slot formed in the control ring.

Preferably, the driven coupling member consists of two parts which are movable circumferentially relative to one another in order to exercise controlling functions. Suitably, in order to provide a compact constructional unit an arcuate recess is provided in the driven coupling member, in which recess a spring is disposed which acts between this coupling member and the control ring. In this manner the spring is accommodated separate from the other parts although the possibility is not excluded of mounting the spring externally on pegs or of using the spring in conjunction with a stop member as will be described hereinafter.

According to one practical embodiment of the invention, the control ring has an abutment face which is associated with a retaining finger or pawl which is externally controllable and which holds the control ring against rotation upon engagement with the abutment face, in which position the control ring recess is brought into alignment with the recess in the driving coupling member. By the speedy withdrawal of the rotatable body under the displacing effect of the driving member and the simultaneous aid of the centrifugal force, a disengagement of the coupling is thereby permitted with the driven member being brought to a complete standstill within a predetermined defined angular range of the order of 15°, whereby the system mechanically prevents a premature stoppage of the driven member and the retaining finger prevents any further rotation and also any over-running, as a result of which an instantaneous action is ensured for the coupling with the engagement of the coupling being completely suspended for the time being.

According to one advantageous embodiment of the invention, a reverse abutment face is provided on the periphery of the driven coupling member in association with but facing oppositely to the abutment face of the control ring. The retaining finger likewise engages this reverse abutment face after a movement of the control ring relative to the driven coupling member carrying it, in order to prevent any reverse movement under the action of the spring during the engagement of the retaining finger. From this point of view, the free-running coupling according to the invention includes the mounting of the coupling in a frame which has bearing means for shafts to be coupled or for the two coupling members, as well as control means for the retaining finger for example in the form of an electromagnet, and which also carries guide means for the retaining finger in relation to the two oppositely directed abutment faces.

According to a preferred embodiment of the invention, the driven coupling member is formed as a disc with an annular rib projecting axially parallel to the axis of rotation of the driving member, said rib having a hole therethrough, carrying the control ring on its outer surface, and guiding a disc-shaped hub of the driving coupling member on its inner surface.

A preferred embodiment of the invention will now be described in detail in the following description with reference to the accompanying drawings, in which.

Figure 1:
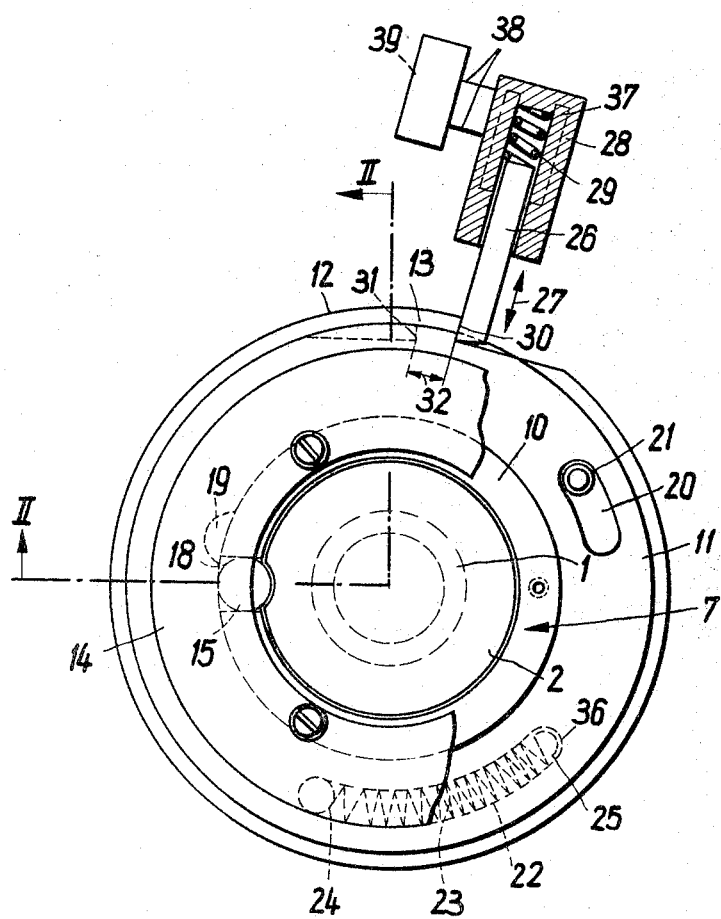
FIG. 1 is a front view of a coupling, partly broken away, shown in the engaged position.
Figure 2:
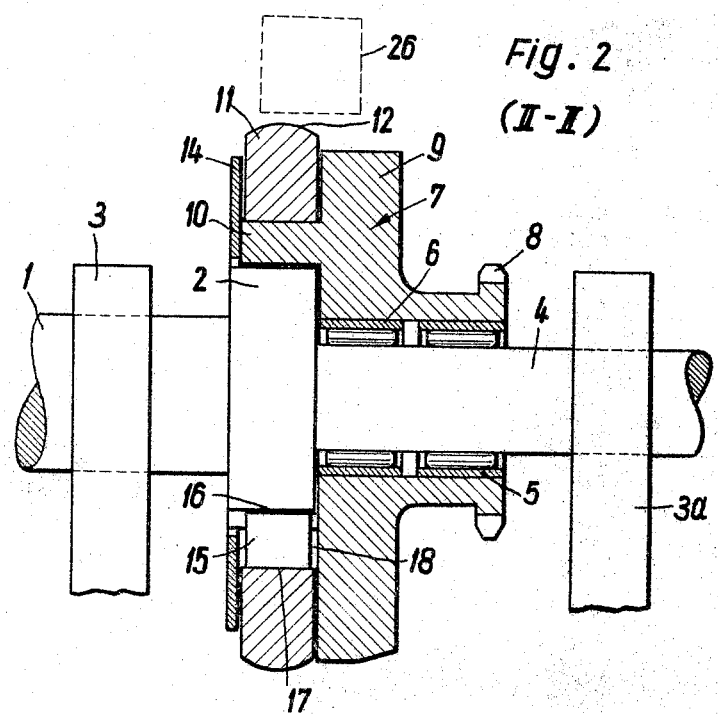
FIG. 2 is a sectional view taken along the line II—II of FIG. 1.
Figure 3:
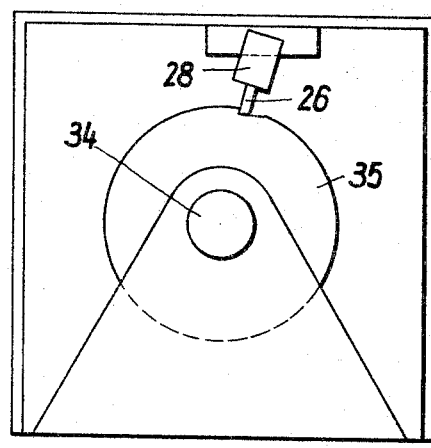
FIG. 3 shows a frame in which the coupling of FIG. 1 is mounted and on which a holding device is arranged.

The coupling as shown in FIGS. 1 and 2 comprises a driving member 1 formed as a shaft and which includes a disc-shaped hub 2 concentric with the shaft. The driving member 1 may be secured for example in a bearing 3 in a frame, as is shown in FIG. 3.

The driving member 1 may extend on the other side of the hub disc 2 to form a shaft extension 4 on which a driven member which is indicated at 7 is mounted by means of bearing elements 5 and 6. This driven member 7 carries a spur gear 8, or a sprocket wheel or other drive transmission means through which a machine to be controlled can be driven. The shaft extension 4 may be mounted in a bearing 3a.

The driven member 7 has a disc-shaped flange 9 extending radially of the drive shaft axis and an annular projecting rib 10 extending axially in the direction of the drive shaft 1 so that the hub 2 can rotate within the projecting rib. A control ring 11 is concentrically disposed around the external surface of the projecting rib 10 and is guided thereon, the peripheral surface of the control ring indicated at 12 extending radially beyond the peripheral surface 13 of the disc-shaped flange 9.

In order to guide the control ring 11, an annular faceplate 14 is secured to the end face of the projecting rib 10.

The member 7 which is to be driven serves as a guide means or carrier for a rotatable body 15, for example a cylindrical roller, whose diameter is greater than the thickness of the projecting rib 10 in the radial direction. The rotatable body is located in a hole 18 formed radially through the rib 10.

A part-circular recess 16 is provided in the external surface of the hub 2 into which the rotatable body 15 is forced when it has been pressed completely into the hole 18, for example by the inner wall surface 17 of the control ring 11. This corresponds to the engaged state of the coupling. The hub 2 thus entrains the driven member 7.

A recess 19 is also formed in the inner wall surface 17 of the control ring 11, this recess corresponding essentially in shape to the part-circular recess 16 and making it possible for the rotatable body 15 to move out of the recess 16 in the hub 2 by means of a radial movement through the hole 18 and thus to come to rest partially in the recess 19 in the control ring. This occurs if the recess 19 in the control ring is disposed directly over the hole 18. This corresponds to the disengaged state of the coupling in which the hub 2 is able to rotate while the rotatable body 15 is held stationary in the now stationary driven member 7.

It is thus possible, contrary to the position represented in FIG. 1, to arrange that the point of disengagement always occurs at a position in which the hole 18 is disposed in the lower region of the coupling. In such a case, the weight of the rotatable body ensures that there is no possibility of engaging the coupling as a result of forces developing in the interior of the coupling without some control force being exerted. The illustrated arrangement, however, works reliably in the described manner, especially as a rotational one-step coupling, in which re-engagement by the action of gravity alone on the rotatable member is advantageous. The choice of the position of disengagement depends also on the particular use to which the coupling is to be put.

The control ring 11 is only able to undergo limited rotation relative to the projecting rib 10. An arcuate slot 20 formed in the circumferential direction in the control ring 11, as indicated in FIG. 1, and a peg 21 extending axially from the disc-shaped flange 9 into the slot serve as locking means. It will thus be appreciated that the control ring 11 can only move a distance relative to the rib 10 corresponding to the length of the slot 20. The slot 20 is so dimensioned that when the peg 21 is at its end positions in the arcuate slot the recess 19 in the control ring either occupies the position indicated in the drawing or is aligned with the hole 18.

Moreover, the control ring 11 is also provided with an elongated arcuate recess 22 extending in the circumferential direction on the side remote in FIG. 1 from the observer. A compression spring 23 is arranged in this recess 22, the spring being held at one end at 24 in the recess and at the other end at 25 by a fixing pin 36 which is secured on the flange 9 and extends into the recess 22.

As shown in FIG. 1, the abutment peg 21 is forced against one end of the slot 20 in the control ring. If however, the driving coupling member 1 and the driven coupling member 7 are rotated relative to the FIG. 1 position in a clockwise sense while the control ring 11 is held fast, then the end of the slot 20 shown as the lower end in FIG. 1 will be engaged by the downwardly moving peg 21 and the spring 23 will be compressed. By such relative movement the projecting rib 10 is also entrained to move in the clockwise sense until the hole 18 moves into alignment with the recess 19 in the control ring. Then, under the effect of the centrifugal force, the rotatable body moves radially outwards into the recess 19 so that the disc-shaped flange 9 is momentarily restrained by the stationary nature of the control ring 11. Since the spring 23 is thereby compressed it takes up part of the energy produced by the braking action. It is thus essential for the invention that the coupling body, i.e. the rotatable body 15, which is subjected to shear stress not only takes up the drive between the driving and driven members during engagement of the coupling but also acts as a holding means to ensure that the driven member is brought to rest on disengagement of the coupling. This two-fold action is an essential feature of the invention.

In order to effect disengagement of the coupling, a retaining finger or pawl 26 is provided which is reciprocally movable in the direction of arrow 27 by means of a control device 28, for example an electro-magnet. This finger 26 is either spring-urged into engagement with the control ring 11, i.e., by means of a mechanical spring 29, or is yieldingly held by the magnetic field of an electro-magnet.

In the embodiment illustrated which comprises an electro-magnet, the coil winding indicated at 37 (FIG. 1) is arranged to be selectively energised over conductor leads from an energy source with associated control switch means. Also in this case, a spring is preferably provided which acts to withdraw the finger from engagement with the control ring upon energisation of the electro-magnet. If the spring is arranged to be a tension spring however, the finger would be projected into engagement with the control ring upon energisation of the electro-magnet.

The retaining finger 26 is associated in action with an abutment face 30 formed by a wedge portion being cut away from the external periphery of the control ring 11. The abutment face 30 forms a surface which extends in the radial direction of the coupling and is arranged to strike the finger 26 and be retained thereby.

Since the spring 23 itself subjects the coupling to tension in the disengaged state, in order to bring the driven member 7 to a perfect standstill reverse movement of the disc-shaped flange 9 under the stress of the spring 23 must be avoided. For this reason, the external periphery 13 of the flange 9 is provided with a corresponding abutment face 31 formed by a similar wedge-shaped cut-out but arranged to face in the opposite direction to the face 30, thus permitting a corresponding retaining engagement with the finger 26 to prevent any such reverse movement. The spacing 32 between the two abutment faces 30 and 31 is of such magnitude that the reverse abutment face 31 rests against the finger 26 when the hole 18 is in alignment with the recess 19 in the control ring. The finger 26 has a thickness axially of the coupling sufficient to extend over both the flange 9 and the control ring 11 so as to be able to strike both of the abutment faces.

It will be apparent that in the stationary position, on the one hand, the rotatable body 15 remains at rest, and on the other hand, the system is in readiness for a new engagement of the coupling. If the finger 26 is withdrawn, then the tensioning spring 23 attempts to rotate the control ring 11 and the disc-shaped flange 9 relative to one another so that they take up the position indicated in FIG. 1. This is only possible if the recess 16 provided facing the inner wall surface of the rib 10 extends beyond and up to the recess 19 since then the flank pressure exerted from the side of the recess 19 can displace the rotatable body 15 through the hole 18 into the recess 16.

Thus, it is effectively advantageous in use of the coupling as a one-step coupling that the movement of the rotatable body 15 at least takes place in a downward sloping direction so that its own weight aids the engagement.

FIG. 3 shows a frame 33 in which the free-running coupling 35 is arranged on bearing means 34 and in which also the control means 28 for the retaining finger 26 are mounted. These parts together form a self-contained structure.

I claim:

1. A free-running coupling comprising, in combination,
    a first driving coupling member including a shaft (1) on which a disc-shaped hub (2) is arranged and which is elongated to form an axial shaft extension (4),
    a second driven coupling member (7) freely rotatably mounted on said first coupling member,
    said second coupling member having a flange (9) extending radially of the coupling parallel to the disc-shaped hub (2),
    said second coupling member having a rib (10) projecting axially from said flange (9) around said disc-shaped hub (2),
    and said second coupling member including drive transmission means (8),
    said rib (10) having a hole (18) formed therethrough,
    said disc-shaped hub (2) having a part-circular first recess (16) formed therein which is open to said rib (10),
    a control ring (11) mounted to be freely rotatable around said rib (10),
    said control ring having a second recess (19) formed therein which corresponds to said first recess (16) and is open to said rib (10),
    said first and second recesses and said hole being so arranged that they can be moved into alignment with each other,
    a rotatable body (15) disposed in said hole (18) and dimensioned such that when seated in one of said recesses and the hole in the rib it cannot project into the other of said recesses on the other side of the rib,
    locking means (20, 21) disposed between said flange (9) and said control ring (11) permitting only limited arcuate movement of the control ring relative to the rib (10) between two terminal positions, such that in one of said terminal positions said second recess (19) is offset relative to the hole (18) and in the other of said terminal positions said second recess (19) is aligned with said hole (18),
    a pawl member (26) arranged to be movable into retaining engagement with an abutment stop (30) defined by said control ring (11), and being arranged in a direction such that on engagement of the pawl member (26) with the abutment stop (30) said locking means is moved from said one to said other of the terminal positions,
    bearing means (3, 3a, 34) in which said shaft (1) and said shaft extension (4) are mounted,
    a frame (33) in which said bearing means are disposed,
    and control means (28) for said pawl member (26) mounted in said frame.

2. A free-running coupling as claimed in claim 1, in which the rotatable body serves both to take up the drive between the coupling members and also as a retaining means for bringing said second coupling member to a defined stationary position in the disengaged state of the coupling.

3. A free-running coupling as claimed in claim 1, which includes spring means (23) provided between said control ring (11) and said flange (9) to provide an elastic setting of said locking means in said one terminal position.

4. A free-running coupling as claimed in claim 1, in which said locking means consists of a slot (20) in said control ring (11) and a peg (21) secured to said flange (9) and arranged to engage in the slot (20), the location of the peg at the ends of the slot defining said terminal positions.

5. A free-running coupling as claimed in claim 3, in which said control ring (11) is provided with an arcuate recess (22) for said spring means (23), and in which a pin (36) secured to said flange (9) locates itself at one end of said arcuate recess (22) when said locking means are disposed in said one terminal position, said spring means (23) being arranged between said pin (36) and the opposite end of the arcuate recess (22).

6. A free-running coupling as claimed in claim 1, in which said flange (9) defines a second abutment stop (31) facing in the opposite direction to the abutment stop (30) defined by the control ring (11), said pawl member (26) having an axial thickness such that it extends over the control ring (11) and the flange (9), the two abutment stops being spaced from one another such that after engagement of the pawl member (26) with said first abutment stop (30) a further rotation of the second coupling member with said flange brings said second abutment stop (31) into engagement with the pawl member (26) under the action of spring means (23) in order to prevent any reverse rotational movement.

7. A free-running coupling as claimed in claim 1, in which said said pawl member is arranged in a position in which it retains the control ring in a position in which said rotatable body is located in the lower half of the coupling.

References Cited by the Examiner
UNITED STATES PATENTS

| | | | |
|---|---|---|---|
| 1,456,324 | 5/1923 | Maier | 192—27 |
| 1,980,757 | 11/1934 | Janda | 192—27 |
| 2,257,802 | 10/1941 | Jentsch | 192—27 |

MARK NEWMAN, *Primary Examiner.*

A. McKEON, *Assistant Examiner.*